(12) United States Patent
Hobbs (10) Patent No.: US 12,362,629 B2
(45) Date of Patent: Jul. 15, 2025

(54) HANDWHEEL SYSTEMS HAVING VIBRATION MITIGATORS

(71) Applicant: Nodal Film Systems LLC, Los Angeles, CA (US)

(72) Inventor: Boyd Randolph Hobbs, Los Angeles, CA (US)

(73) Assignee: Nodal Film Systems LL, Los Angeles, CA (US)

( * ) Notice: Subject to any disclaimer, the term of this patent is extended or adjusted under 35 U.S.C. 154(b) by 300 days.

(21) Appl. No.: 18/194,020

(22) Filed: Mar. 31, 2023

(65) Prior Publication Data

US 2024/0333094 A1 Oct. 3, 2024

(51) Int. Cl.
| | |
|---|---|
| *H02K 7/10* | (2006.01) |
| *H02K 1/12* | (2006.01) |
| *H02K 1/22* | (2006.01) |
| *H02K 3/26* | (2006.01) |
| *H02K 5/04* | (2006.01) |

(52) U.S. Cl.
CPC ............. *H02K 7/10* (2013.01); *H02K 1/12* (2013.01); *H02K 1/22* (2013.01); *H02K 3/26* (2013.01); *H02K 5/04* (2013.01)

(58) Field of Classification Search
CPC .. H02K 1/12; H02K 1/22; H02K 3/26; H02K 5/04; H02K 7/10
USPC ..................................................... 310/216.001
See application file for complete search history.

(56) References Cited

U.S. PATENT DOCUMENTS

| | | | |
|---|---|---|---|
| 2022/0094253 A1* | 3/2022 | Houston | H02K 7/003 |
| 2022/0395861 A1* | 12/2022 | Snow | G06F 3/016 |
| 2023/0216363 A1* | 7/2023 | Hobbs | H02K 11/0094 310/67 R |
| 2024/0333094 A1* | 10/2024 | Hobbs | H02K 1/12 |

\* cited by examiner

*Primary Examiner* — Rashad H Johnson
(74) *Attorney, Agent, or Firm* — Sean Lynch; Lynch LLP (57) ABSTRACT

Handwheel systems of the inventive subject matter can be used in a variety of different contexts, including by camera operators. Handwheel systems disclosed in this application provide haptic feedback, which requires high amounts of torque generated by a motor built into the system. PCB stator motors are implemented for their ability to generate high amounts of torque in a compact form factor. Control systems used to drive motors in these systems update at rates that are typically within range of human hearing, and because of the high torque generation, vibrations can be transferred to different components of the handwheel systems, which can cause some components to audibly vibrate. To mitigate or eliminate these audible vibrations, handwheel systems disclosed in this application incorporate adhesive tapes and bushings that prevent vibrations from passing into components that are prone to audible vibrations.

14 Claims, 5 Drawing Sheets

HANDWHEEL SYSTEMS HAVING VIBRATION MITIGATORS

FIELD OF THE INVENTION

The field of the invention is handwheel systems having haptic feedback.

BACKGROUND

The background description includes information that may be useful in understanding the present invention. It is not an admission that any of the information provided in this application is prior art or relevant to the presently claimed invention, or that any publication specifically or implicitly referenced is prior art.

Creating handwheels that create haptic feedback gives rise to new challenges that traditional motors simply do not face. For example, when creating handwheels using printed circuit board (PCB) stator motors, relatively high peak torque is required to match and counter input forces from a human operator. On other words, when an operator turns a handwheel, high resisting torque must be generated to create a desired haptic feedback to resist the user's input. This results in the handwheel feeling like it has a higher mass than it has in reality, which is a desirable quality for handwheel operators, especially in the context of cinematography. Because the physical, real mass of the handwheel components can be low mass relative to the forces required to create a desired haptic feedback (e.g., higher mass), and because PCB stator motors are configured different from ordinary electric motors, such an application can lead to audible acoustic harmonics originating from some of the handwheel system's components. This can be a result of, e.g., the system's proportional-integral-derivative (PID) control system.

Audible vibrations resulting from resonance within a handwheel system are not desirable, giving rise to a need to dampen or otherwise eliminate those vibrations. Because handwheel systems implementing PCB stator motors are completely new, solutions to all the problems that come along with a new technology have not yet been appreciated. Ways of eliminating structural vibrations in such handwheel systems are disclosed in this application.

SUMMARY OF THE INVENTION

The present invention is directed to apparatuses, systems, and methods of vibration mitigation incorporated into handwheel systems that provide haptic feedback. In one aspect of the inventive subject matter, a handwheel system comprises: a motor having a printed circuit board (PCB) stator, a rotor, and a motor body; where the PCB stator is coupled with the motor body via an adhesive tape; where a cover is coupled with the rotor via a second adhesive tape; where the adhesive tape comprises a first acrylic foam that is configured to damp mechanical vibrations; and where the second adhesive tape comprises a second acrylic foam that is configured to damp the mechanical vibrations.

In some embodiments, the handwheel system also has a hub coupled with the motor body, where an O-ring and a set of bushings contact both the cover and the hub. The O-ring and the set of bushings are implemented to damp structural vibrations. The O-ring and the bushings can be made from vibration damping materials. The motor body can include a concave portion, and at least a portion of the rotor can then be disposed within the concave portion.

In some embodiments, the handwheel system also includes a hub coupled with a bearing mount that is coupled with the motor body, and the hub can be coupled with the bearing mount via a third adhesive tape that is configured to damp mechanical vibrations originating from the motor. In some embodiments, a rotatable wheel couples with the rotor, where the rotatable wheel is designed for human interaction and input.

In another aspect of the inventive subject matter, a handwheel system comprises: a motor having a printed circuit board (PCB) stator, a rotor, and a motor body; where the PCB stator is coupled with a secondary PCB via an adhesive tape, and where the secondary PCB is coupled with the motor body; where the secondary PCB includes motor driver electronics; where a cover is coupled with the rotor via a second adhesive tape; where the adhesive tape comprises a first acrylic foam that is configured to damp mechanical vibrations originating from the PCB stator; and where the second adhesive tape comprises a second acrylic foam that is configured to damp mechanical vibrations originating from the rotor.

In some embodiments, the handwheel system also includes a hub coupled with the motor body on a side opposite the secondary PCB, where an O-ring and a set of bushings contact both the cover and the hub. The O-ring and bushings can be made from vibration damping materials. In some embodiments, the motor body can include a concave portion, and at least a portion of the rotor can then be disposed within the concave portion.

The handwheel system can also include a hub that is coupled with a bearing mount that is itself coupled with the motor body. The hub can then be coupled with the bearing mount via a third adhesive tape that is configured to damp mechanical vibrations originating from the motor. In some embodiments, a rotatable wheel couples with the rotor, where the rotatable wheel is designed for human interaction and input.

One should appreciate that the disclosed subject matter provides many advantageous technical effects relating to high torque haptic feedback handwheel systems that do not audibly vibrate during operation, all using low-cost, easy to implement damping components.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The use of printed circuit board (PCB) stator motors in handwheels is a new technology, and with any new technology, new technical problems arise. To create a handwheel system that can provide haptic feedback to mimic the feel that a camera operator would experience using an older, mechanical system, the handwheel system must create high amounts of torque. This torque is applied in a way that gives the handwheel the feel of a heavy mechanical system while in reality the system is lightweight and highly portable. Embodiments of the inventive subject matter can be used in a wide variety of applications, including racing wheels (e.g., for driving simulators and games), as well as for exercise equipment. Although the description below is focused on camera operators and implementations in film equipment, this application expressly contemplates that the "camera operator" can be any user and the handwheel system can be implemented in a wide variety of different applications that require a wheel that gives haptic feedback.

When a mechanical handwheel system is used and a camera operator manipulates the handwheel, the camera operator must turn a wheel that feels heavy because it is moving heavy equipment. The resisting forces experienced by the user are proportional to the weight of the real mass being manipulated. The more force an operator applies, the more equal and opposite counter force is felt due to the rotational inertia of the handwheel system. If the payload is increased, the inertial forces will also increase.

When a handwheel system uses a motor to simulate a heavier mechanical system, a human operator is not manipulating a real mass. Instead, the forces felt by the operator mostly arise from clever use of the motor in an on-demand, equal-and-opposite manner. If a simulated mass is intended to be high, and the operator turns the handwheel with high acceleration or speed, the motor must be able to quickly generate high amounts of counter torque.

Handwheel systems that implement PCB stator motors are lightweight and compact. Thus, the actual mass that an operator has to rotate while using a PCB stator motor-driven handwheel system is lightweight compared to the simulated forces created by the motor, where the actual mass is that of the handwheel and the components that rotate with the handwheel. PCB motor-driven handwheel systems are generally lightweight to improve portability and ease of use, and to keep weight down, some components can be made from lightweight materials or can be designed using thin pieces of metal, small components, and so on. Moreover, PCB stator motors represent an improvement over typical electronic motor configurations because other motor configurations cannot be made in such compact enclosures. For this reason, ordinary motor configurations (i.e., motors that do not have PCB stators) cannot be used in handwheel systems of the inventive subject matter described in this application.

When a PCB stator motor is selected for use in a handwheel system that simulates inertia, the PCB stator motor is chosen based on the forces it must generate to properly simulate a non-existent payload that can be felt by a human user. In haptics applications, the chosen motor must generally be large compared to a motor that would otherwise be needed just to cause rotation of the handwheel.

But motors that generate enough torque for haptics applications can bring about acoustics problems. In other words, parts of the system can audibly vibrate, causing, e.g., buzzing or audible vibrating that can be annoying, loud, or otherwise cause the system to make undesirable sounds.

These acoustic issues can arise due to a combination of using a high torque motor in a system that implements lightweight and sometimes thin components. Typical brushless motor drivers use a proportional-integral-derivative (PID) control system that runs at a high frequency to update position and motor torque—for example 8 kHz. A high frequency is necessary in successfully simulate mass that feels real to the operator. In a haptics application, the handwheel's position and the motor's movements must be updated many times faster than human perception.

Additionally, the motor is driven via pulse width modulator (PWM) with high frequency gate switching. The duty cycle of the PWM that drives to motor operates at a rate faster (e.g., 24 kHz) than the PID loop updates (e.g., 8 kHz). In this gate switching, certain phases of the motor are open to current flow that creates magnetic forces that cause the motor to rotate. To create smooth movement, the duty cycle driving the motor results in gate switching that occurs faster than is perceptible to a human operator and results in gradual shifting of the PWM's duty cycle balance between phases.

Typically, inertia of a payload smooths out jittery or unsmooth motor movements that result from the motor's PID control system or duty cycle frequencies. But in embodiments of the inventive subject matter (and other haptics applications), the haptic motor generates torque that acts on lightweight components of the handwheel system with forces much greater than necessary to merely move the components—it must oppose forces imparted by a human operator to such a degree that the human feels like they are turning a heavy wheel. Update rates in haptic applications (e.g., like those in embodiments of the inventive subject matter) occur at frequencies that are faster than can be tactilely perceived by a human operator. But these update frequencies exist within the range of what the human ear can perceive as sound (typically 20 Hz to 20 kHz).

Lightweight, rigid materials used in embodiments of the inventive subject matter are, in some components, formed to include thin, flat portions. When formed into thin, flat portions, especially, these components can audibly vibrate, creating unwanted noise. This type of noise does not occur in more typical motor applications because the physical counter forces of a payload's inertia fight the motor's position thereby acting as a smoothing force to absorb and prevent unwanted vibrations from creating audible sounds. Haptic feedback systems like handwheel systems of the inventive subject matter, on the other hand, are lightweight, use thin components, have update rates in the audible range, and are subject to high torque. All these conditions give rise to audible vibrations in certain components. Therefore, handwheel systems of the inventive subject matter need to be designed to damp structural vibrations to prevent unwanted noise from occurring.

Several less-than-optimal solutions exist for this problem. For example, the components of the handwheel that rotate with the wheel can be made with more mass. Increased mass can smooth out high frequency vibrations that otherwise would emanate from the motor, resulting in elimination of audible noise. But this solution runs counter to one purpose of the inventive subject matter, which is to is create a lightweight handwheel system that provides haptic feedback to a camera operator to give that operator a familiar heavy feel when using the system.

In another suboptimal solution, harmonic simulations could be run using CAD software on multiple generations of prototypes to design each individual part to eliminate audible vibrations during operation. But this is engineering and design intensive and can result in increased research and development costs.

Another suboptimal solution would be to dampen electrical signals to the handwheel system's PCB stator motor via introduction of inductance. But adding inductance to the motor phases can harm motor performance by delaying a motor's response time. In a haptics application where motor response time is crucial, this solution is not optimal. Introducing inductance also adds components, which increases complexity, takes up more space, and increases cost.

In another suboptimal solution, the motor driver's timing can be adjusted to avoid harmonic and other structural vibrations. But given the balance of motor strength (e.g., maximum torque) compared to the weight of a handwheel system's components, structural vibrations are nevertheless prone to generation. Moreover, a motor driver's timing is generally determined by complex and often crucial factors, such as limitations of a microprocessor tasked with handling the PID control system.

Another way to prevent acoustic vibrations would be to use less rigid materials (e.g., plastics) to construct the elements that are prone to vibration. While plausible, not all applications can or should be manufactured with plastics-plastic can appear cheap, reduce durability, and can shatter or break. Moreover, the PCB stator itself needs to be affixed to a rigid mount, ideally the mount sufficiently rigid that the forces generated by the motor do not cause deflection or strain in the mount or any of its surrounding components. Using less rigid materials can result in excess wear and tear or cracking resulting from a high torque application like a haptic feedback handwheel system.

Embodiments of the inventive subject matter therefore isolate the PCB stator motor (e.g., both the PCB stator and the rotor) from rigid surfaces that are subject to acoustic vibrations using thin materials with low resonance, such as rubber and polymer tape. Thus, vibrations resulting from the PCB stator motor's PID control system position updates are transferred to the lightweight materials via components that are selected for their vibration damping qualities. Similarly, a human operator's physical input to the system is also damped by these vibration damping materials, which has the impact of smoothing out torque curves, thus reducing momentary peak torque.

By using vibration damping materials designed as small or thin components, the softness of the materials is imperceptible to the user and does not impact handwheel performance, while still absorbing a wide range of vibration frequencies that could otherwise cause audible acoustic vibrations if allowed to reach certain components of the system.

Figure 1:
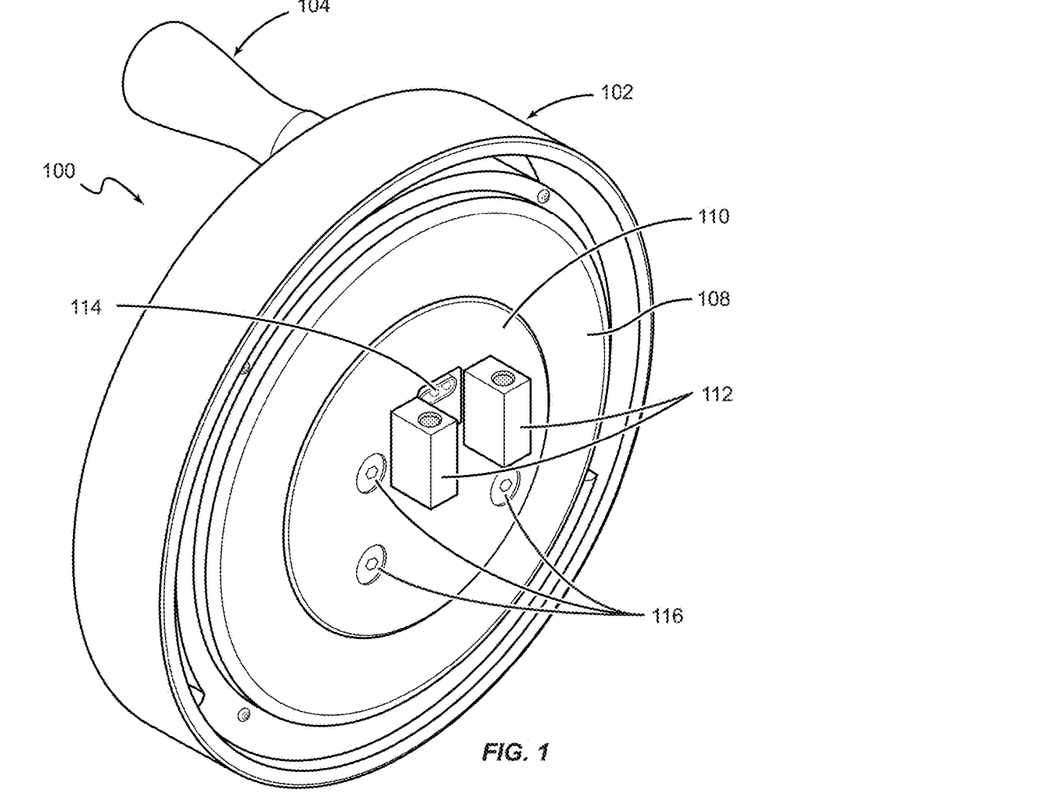
FIG. 1 shows a handwheel system from a rear perspective view.

FIG. 1 shows a handwheel system 100 of the inventive subject matter from a top, rear perspective. A rotatable wheel 102 has a handle 104 coupled with it (not necessarily directly), and rotatable wheel 102 is coupled to motor body 106. Motor body 106 has a back cover 108 and a back hub no. Coupled with back hub no is a set of mounting components 112, and back hub no also includes an I/O port 114.

Figure 2:
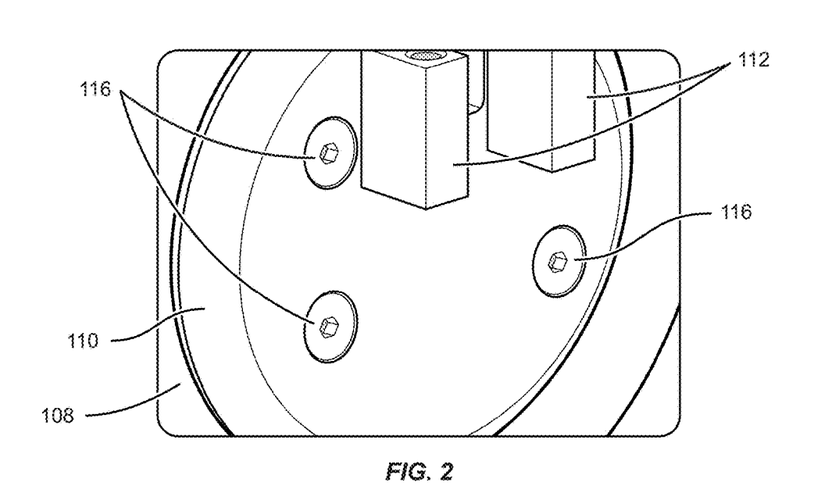
FIG. 2 shows a detail view of a portion of the handwheel system shown in FIG. 1.
Figure 3:
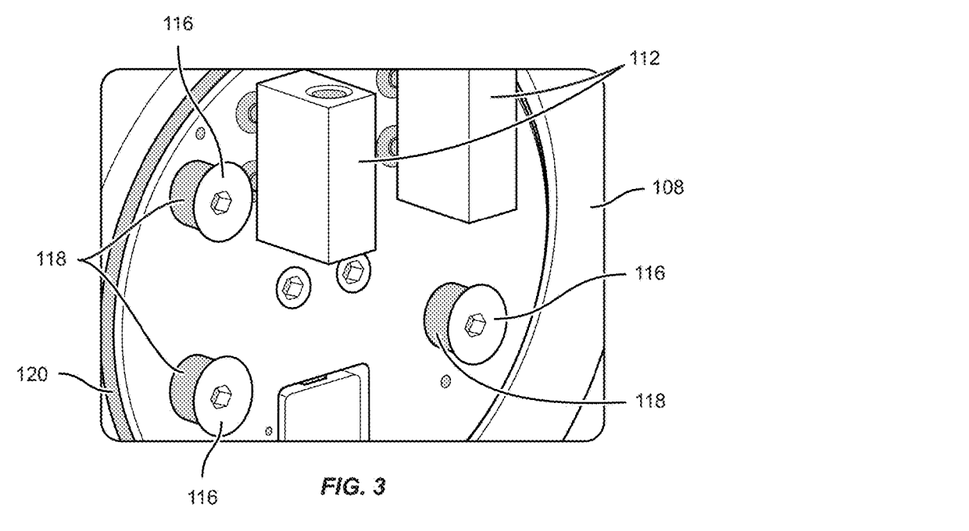
FIG. 3 shows the detail view of FIG. 2 with back hub removed.
Figure 4:
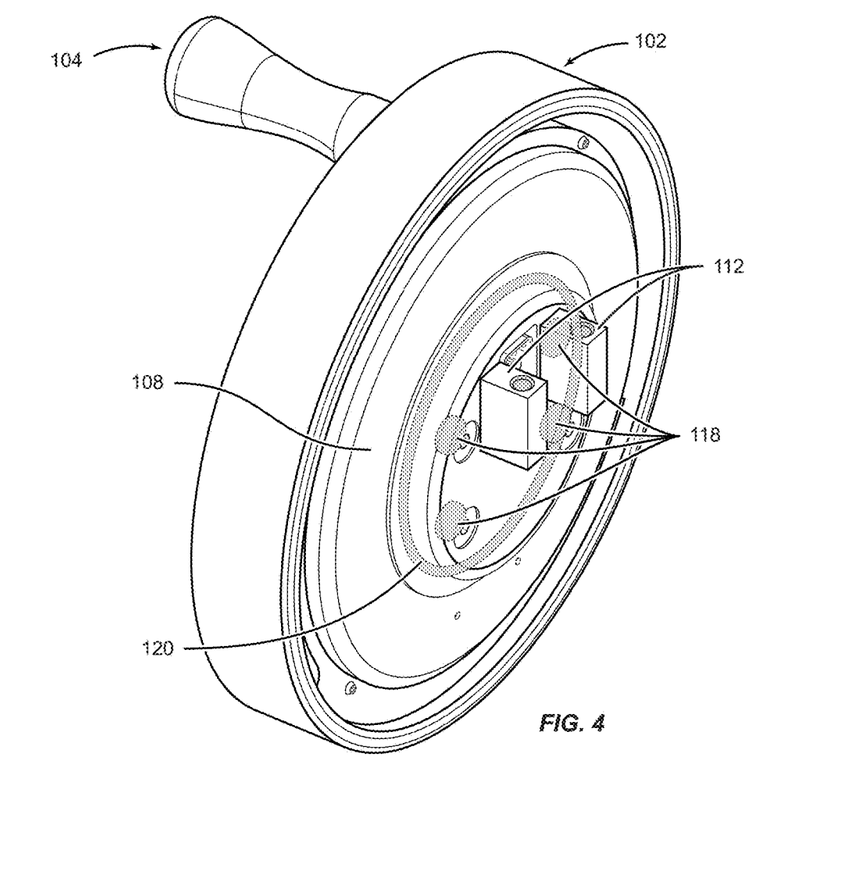
FIG. 4 shows the handwheel system with O-ring and bushings visible below components that would ordinarily obscure them.

FIG. 2 shows a closer view of motor body 106, back cover 108, and back hub no. Back hub no is coupled with back cover 108 by a plurality of screws 116 (three are visible, with a fourth symmetrically placed but obscured by mounting component 112) that pass through back hub no into back cover 108. FIG. 3 shows the same view as FIG. 2 with back hub no removed. From this view, bushings 118 and O-ring 120 are visible. Bushings 118 and O-ring 120 act as an interface between back hub no and back cover 108. Back hub 110 is typically made from a rigid material (e.g., a metal) formed as a relatively thin piece, which, as described above in detail, can be caused to vibrate during normal operation of handwheel system 100. O-ring 120 can be made from, e.g., rubber, plastic, or another material having properties that minimize or prevent vibration from being transmitted from back cover 108 to back hub 110. Bushings 118 can also be made from, e.g., a rubber or plastic similar to O-ring 120. Bushings 118 can be sized and dimensioned according to damping needs. Between O-ring 120 and bushings 118, back hub 110 is effectively vibrationally isolated from back cover 108 sufficiently to prevent back hub 110 from making noise during operation of handwheel system 100. FIG. 4 shows handwheel system 100 fully assembled, showing the positioning of O-ring 120 and bushings 118 beneath back hub no.

Figures 5, 6, 7:
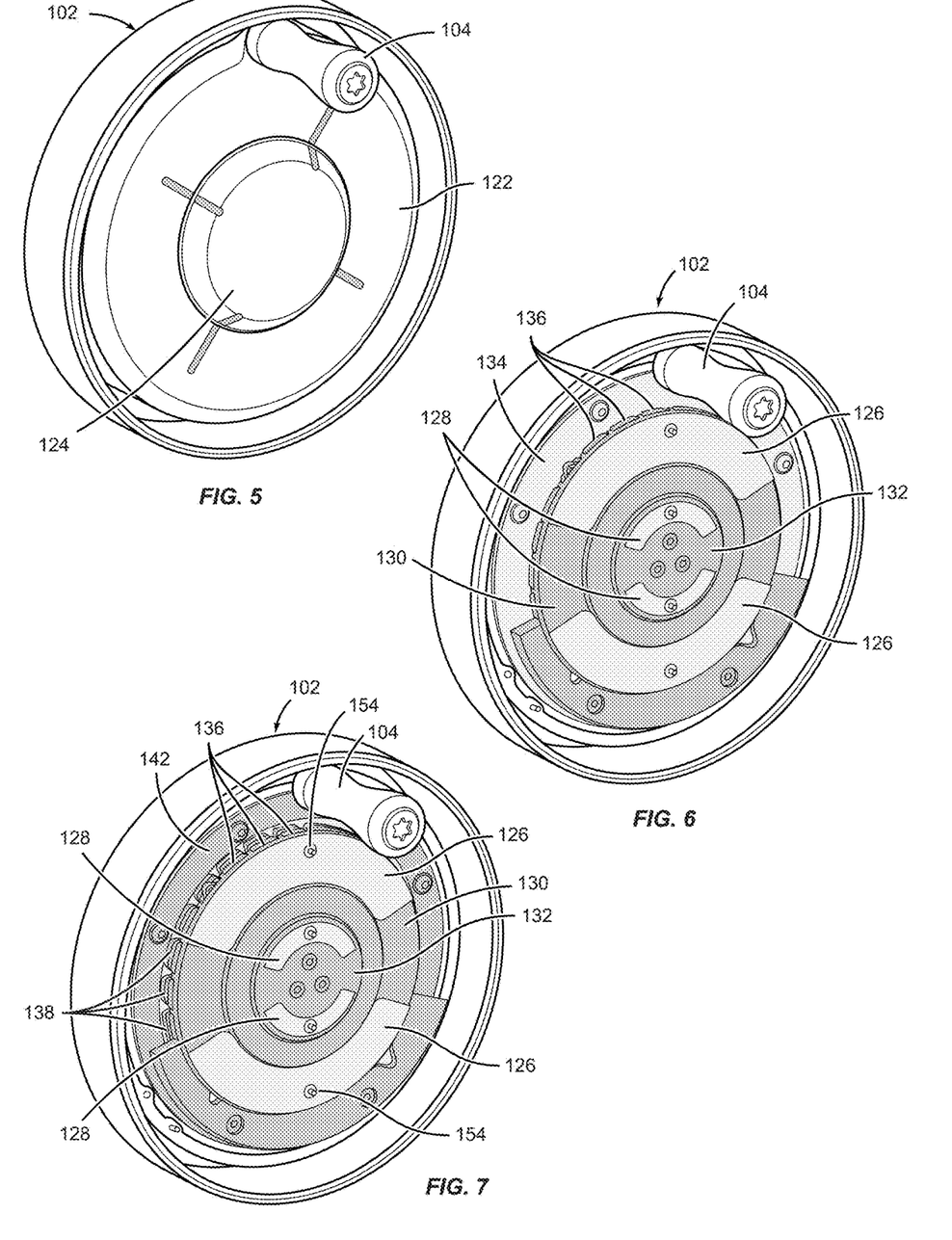
FIG. 5 shows a front perspective view of the handwheel system.
FIG. 6 shows the handwheel system with the front cover and the front hub removed.
FIG. 7 shows the handwheel system with the front cover, the front hub, and the PCB stator removed.

FIGS. 5-7 show a front view of handwheel system 100 with progressively more components removed in each figure. In FIG. 5, handwheel system 100 is shown with front cover 122 and front hub 124 in place. Front cover 122 is formed to include a protrusion at a top portion that is designed to mate with handle 104 (where handle 104 is configured to be able to rotate relative to front cover 122). FIG. 6 shows handwheel system 100 with front cover 122 and front hub 124 removed. Below those components are strips of tape. Both outer tape strips 126 and inner tape strips 128 can be, e.g., 3M VHB tape. Appropriate material properties for tape used for vibrational damping as well as to adhere components structurally in a handwheel system of the inventive subject matter include having adhesive on both sides, being made from a sound damping material such as acrylic, acrylic foam, rubber, plastic, or the like.

In a preferred embodiment, a suitable tape can be formed from viscoelastic acrylic foam. Viscoelasticity gives the foam energy absorbing and stress relaxing properties that provides the tape with its unique characteristics. The acrylic chemistry provides durability and strong performance in handwheel systems.

Suitable tapes can use a variety of specific foam, adhesive, color, and release liner types that each result in tapes having different material properties while accomplishing the same end result. For example, tapes can be designed to adhere to specific or a broad range of materials, with conformability, high tensile strength, high shear and peel adhesion, resistance to plasticizer migration, and UL746C recognition (a regulation that sets standards for polymeric materials used in electrical equipment, required by UL50). Suitable tape should be durable, moisture resistant, and solvent resistant.

Tape thickness can range from 0.25 mm to 3 mm in preferred embodiments, but thickness can be outside this range in either direction, depending on the type of tape used. Suitable tapes, in some embodiments, can also be made according to other characteristics including dynamic adhesion performance. 90° peel adhesion can range from 20-60 N/cm. Normal tensile adhesion performance can range from 300 to 1200 kPa. Dynamic overlap shear adhesion performance can range from 300 to 1000 kPa. It should be noted that higher values for adhesion performance can work, too, though generally material limitations make extremely high kPa values impractical or otherwise unachievable.

Thus, outer tape strips 126 and inner tape strips 128 (and any other adhesive tape described in this application) can be selected according to the material properties described above. Outer tape strips 126 are used to adhere front cover 122 to rotor 130 and inner tape strips 128 are used to adhere front hub 124 to bearing mount plate 132. Thus, outer tape strips 126 prevent or minimize vibrations from transferring from rotor 130 into front cover 122 while adhering the two components together, and inner tape strips 128 prevent vibrations from transferring from bearing mount plate 132 into front hub 124 while adhering the two components together. Components adhered by tape can also be affixed to one another by other fasteners such as screws.

FIG. 6 also shows PCB stator 134 and front magnets 136. PCB stator 134 extends down into a slot created between two layers of magnets and two sides of a rotor. Only front magnets 136 and the front portion of rotor 130 are visible in this image. Outer tape strips 126 and inner tape strips 128 are also shown with holes around their middle portions. These holes allow for alignment pegs to protrude through. These pegs facilitate aligning the front hub 124 and front cover 122 with the bearing mount plate 132 and the rotor 130, respectively.

FIG. 7 shows handwheel system 100 with the front cover 122, front hub 124, and PCB stator 134 hidden from view. In this view, front magnets 136 and back magnets 138 are shown coupled with front portion of rotor 130 and back portion of rotor 140. With PCB stator 134 hidden, PCB mount is visible and shown with PCB mounting tape 142 disposed thereon. PCB mounting tape can be selected according to material properties of adhesive tape described above. PCB mounting tape 142 is also implemented to minimize or prevent vibration from transferring from PCB stator 134 into secondary PCB 144 (seen more easily in FIG. 9) and thus into other components of handwheel system 100. Handle 104 is coupled (albeit not directly) with front portion of rotor 130 and thus can be used by a human operator to move rotor 130 relative to PCB stator 134. Secondary PCB 144 can include motor driver electronics, a microprocessor, and any other electronics necessary for proper function of handwheel system 100. Secondary PCB 144 is formed into an annular shape such that it can be coupled with motor body 106.

Figure 8:
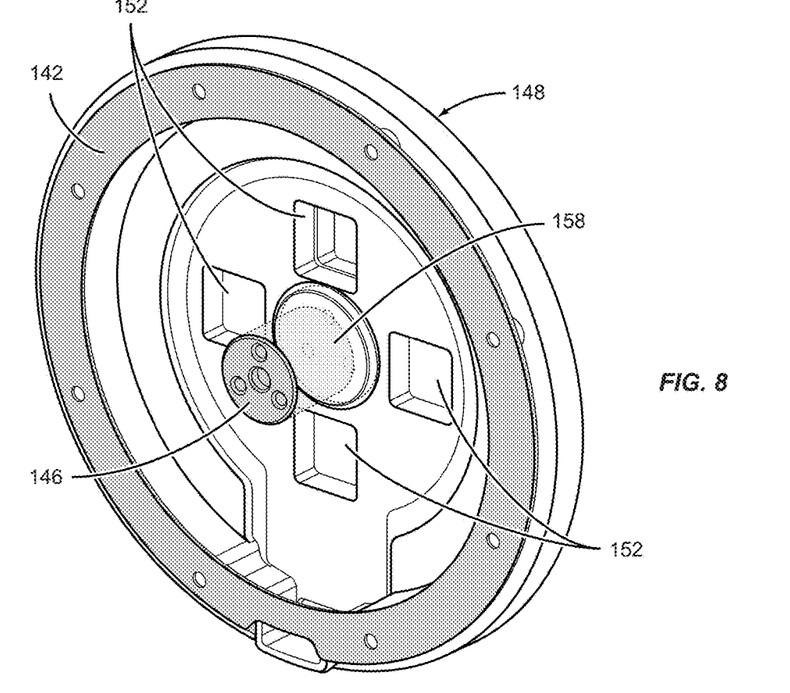
FIG. 8 shows the handwheel system's motor body with the bearing mount coupled thereto.

FIG. 8 shows motor body 106 having secondary PCB 144 coupled thereto, where PCB mounting tape 142 is on the surface of secondary PCB 144 to which the PCB stator 134 couples. Motor body 106 is formed to create a convex space (shown facing the page) into which other components of the handwheel system (such as the PCB stator, rotor, magnets and so on) can be disposed to create a compact design. This is an improvement over non-PCB stator motors, which cannot be configured similarly. Bearing mount 146 is disposed at a center portion of secondary PCB 144, and it is coupled with secondary PCB 144 by both screws and adhesive tape. Bearing mount tape 150 is shown in this image via partially transparent bearing mount 146. Bearing mount tape 150 helps to minimize or eliminate vibrations from passing between components such as between bearing mount 146 and motor body 106 or between PCB stator 134 and motor body 106. Motor body 106 additionally forms spaces 152 that can be used to hold electronics or other components necessary for handwheel system 100.

Figure 9:
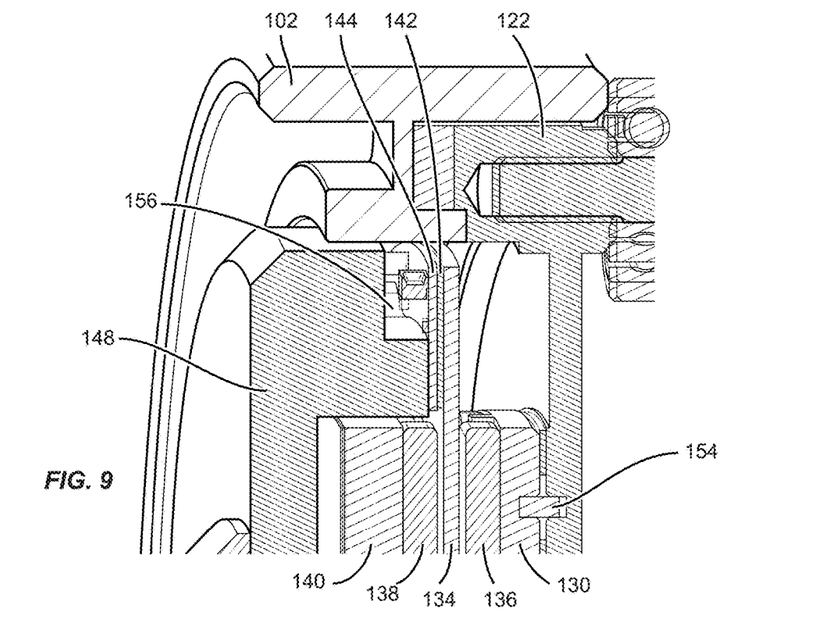
FIG. 9 shows a cutaway detail view of a portion of the handwheel system.

FIG. 9 shows a cutaway view of a portion of handwheel system 100. This view shows PCB stator 134, secondary PCB 144, motor body 106, front magnets 136, and back magnets 138. Outer tape strip 126 is shown between front cover 122 and front portion of rotor 130. Back portion of rotor 140 is also visible. This view shows that PCB mount 144 includes a notched section 156 that makes space for electronic components on secondary PCB 144. Peg 154, which is briefly mentioned above, is also shown extending into both front cover 122 and into front portion of rotor 130.

Figure 10:
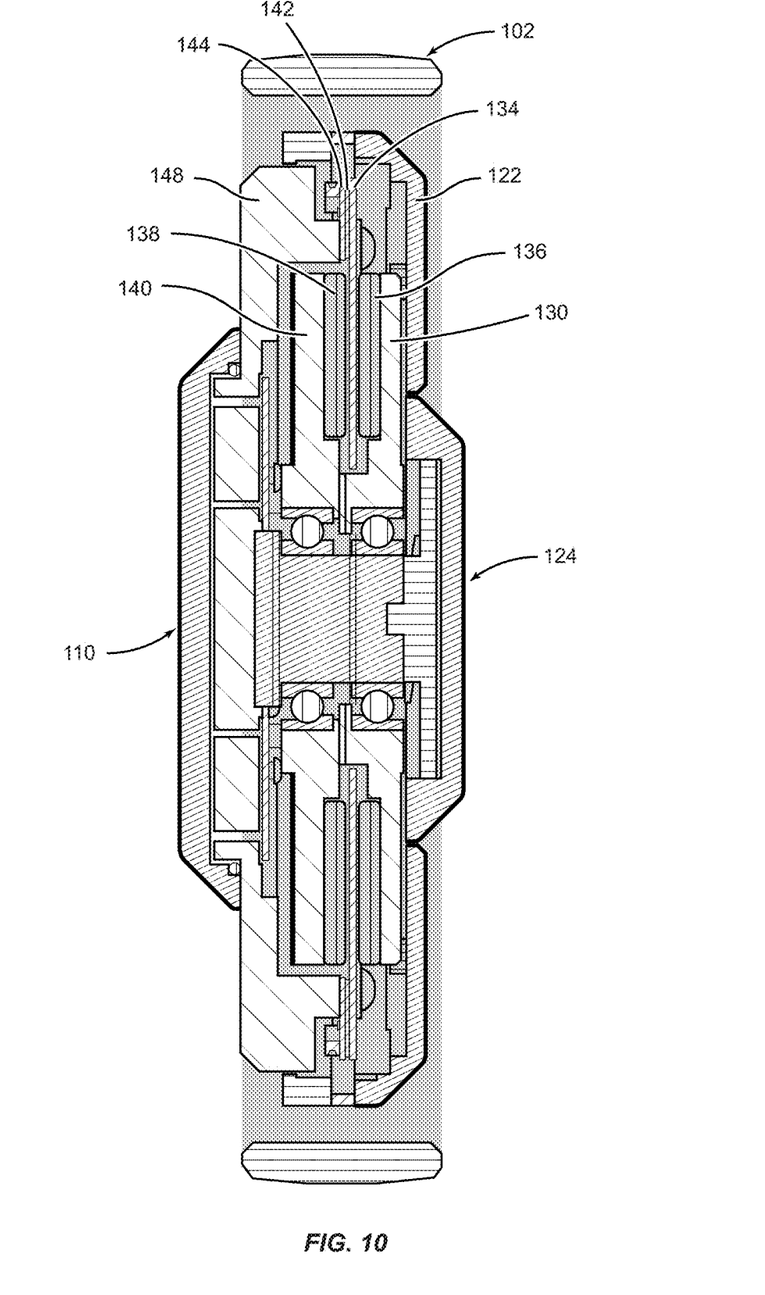
FIG. 10 shows a cutaway view of the handwheel system.

FIG. 10 shows a full cross-sectional view of handwheel system 100. This view shows front bearing 150 and back bearing 152. Front and back bearings 150 and 152 are coupled with bearing mount 146. These bearings allow the components coupled with rotor 130 to rotate with the rotor while encountering little rotational resistance as they rotate relative to bearing mount 146.

Thus, specific systems and methods directed to handwheel systems that provide haptic feedback have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A handwheel system comprising:
    a motor having a printed circuit board (PCB) stator, a rotor, and a motor body;
    wherein the PCB stator is coupled with the motor body via an adhesive tape;
    wherein a cover is coupled with the rotor via a second adhesive tape;
    wherein the adhesive tape comprises a first acrylic foam that is configured to damp mechanical vibrations; and
    wherein the second adhesive tape comprises a second acrylic foam that is configured to damp the mechanical vibrations.

2. The handwheel system of claim 1, further comprising a hub coupled with the motor body, wherein an O-ring and a set of bushings contact both the cover and the hub.

3. The handwheel system of claim 2, wherein the O-ring is made from a vibration damping material.

4. The handwheel system of claim 2, wherein the bushings are made from a vibration damping material.

5. The handwheel system of claim 1, wherein the motor body comprises a concave portion, and wherein at least a portion of the rotor is disposed within the concave portion.

6. The handwheel system of claim 1, further comprising a hub coupled with a bearing mount that is coupled with the motor body, and wherein the hub is coupled with the bearing mount via a third adhesive tape that is configured to damp mechanical vibrations originating from the motor.

7. The handwheel system of claim 1, wherein a rotatable wheel couples with the rotor.

8. A handwheel system comprising:
    a motor having a printed circuit board (PCB) stator, a rotor, and a motor body;
    wherein the PCB stator is coupled with a secondary PCB via an adhesive tape, and
        wherein the secondary PCB is coupled with the motor body;
    the secondary PCB comprising motor driver electronics;
    wherein a cover is coupled with the rotor via a second adhesive tape;
    wherein the adhesive tape comprises a first acrylic foam that is configured to damp mechanical vibrations originating from the PCB stator; and
    wherein the second adhesive tape comprises a second acrylic foam that is configured to damp mechanical vibrations originating from the rotor.

9. The handwheel system of claim 8, further comprising a hub coupled with the motor body on a side opposite the secondary PCB, wherein an O-ring and a set of bushings contact both the cover and the hub.

10. The handwheel system of claim 9, wherein the O-ring is made from a vibration damping material.

11. The handwheel system of claim 9, wherein the bushings are made from a vibration damping material.

12. The handwheel system of claim 8, wherein the motor body comprises a concave portion, and wherein at least a portion of the rotor is disposed within the concave portion.

13. The handwheel system of claim 8, further comprising a hub coupled with a bearing mount that is coupled with the motor body, and wherein the hub is coupled with the bearing mount via a third adhesive tape that is configured to damp mechanical vibrations originating from the motor.

14. The handwheel system of claim 8, wherein a rotatable wheel couples with the rotor.

* * * * *